Julius Petsch.
Coffee Making Apparatus.
Nº 74,937.        Patented Feb. 25. 1868.
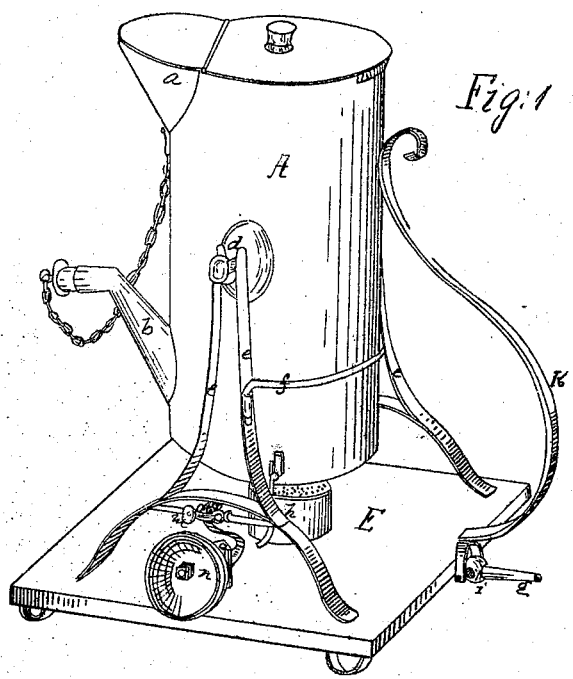
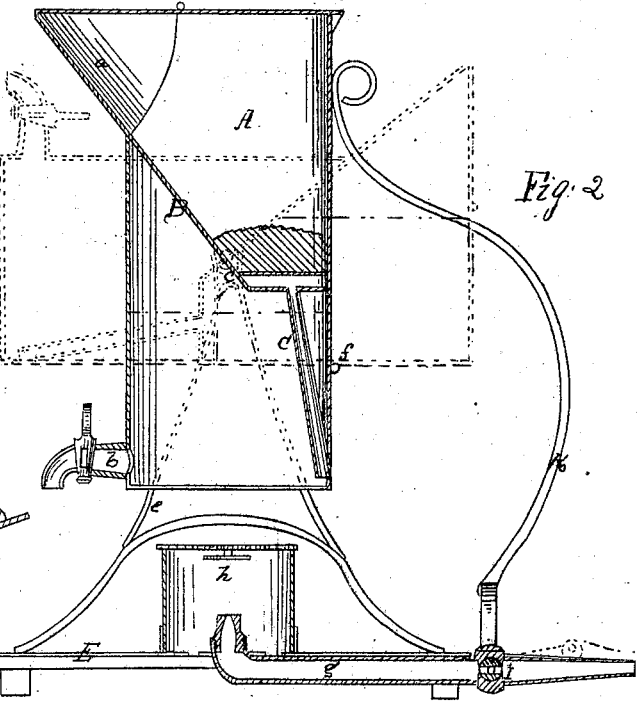
Witnesses
R. S. Turner
W. F. Brown
Inventor
Julius Petsch
Stephen Brignitzky
By his atty R. D. O. Smith

United States Patent Office.

JULIUS PETSCH, OF HANOVER, PRUSSIA, AND STEPHEN N. BUYNITZKY, OF ST. PETERSBURG, RUSSIA.

Letters Patent No. 74,937, dated February 25, 1868.

IMPROVEMENT IN COFFEE-MAKING APPARATUS.

The Schedule referred to in these Letters Patent and making part of the same.

TO ALL WHOM IT MAY CONCERN:

Be it known that we, JULIUS PETSCH, of Hanover, in Prussia, and STEPHEN N. BUYNITZKY, of St. Petersburg, in Russia, have invented a new and useful Improvement in Coffee-Making Apparatus; and we do hereby declare the following to be a full, clear, and exact description of the same, reference being had to the accompanying drawings, in which—

Figure 1 is a perspective view of our invention.

Figure 2 is a vertical longitudinal section of the same.

Figure 3 is a sectional elevation, showing a modification of the device for extinguishing the heating-flame.

Our invention consists, first, in constructing a coffee-pot in which the extract of coffee is made by filtration, and in which the hot water is automatically passed twice through the coffee; second, hanging the apparatus upon trunnions, so that the coffee-pot has an automatic movement during the process of making the "coffee," and is thereby, third, enabled to extinguish the flame by which the beverage is heated, and, fourth, also to ring a bell as a signal of the completion of the process.

That others may understand the construction and operation of our apparatus, we will fully describe it.

It is generally conceded that the finest beverage is made from coffee by the process of filtration, the water being at the boiling-temperature, and that in all respects the flavor is more satisfactory if the boiling liquid is caused to pass through the coffee twice. But in the apparatus in common use for making coffee in accordance with the above-mentioned plan, it is necessary, if a very strong decoction is required, to pour off the liquid after the first filtration, and return it to the ground coffee again. In our apparatus this return is effected automatically by the operation of the machine.

I first construct the cylinder or shell, A, of size sufficient to contain the desired quantity below its central point. This cylinder is divided into two parts, by the partition B, which is placed in the shell at an inclination of forty-five degrees or thereabouts, but I prefer to make the lower portion at right angles to the axis of the cylinder, as shown in fig. 2. From the lower portion of the partition B the tube C descends to a point very near to the bottom and rear wall of the cylinder, as shown also in fig. 2, and above the upper end of the tube C we place the strainer D, which may be made of wire gauze or of perforated tin, and may be removable or not, as convenient, though it may be preferable to make it removable, so that the tube C may be readily accessible for the purpose of removing any obstruction which may gain access thereto. The lip $a$ and hinged cover on the front side of the cylinder are for the purpose of admitting the necessary water and coffee, and the spout or stop-cock $b$ permits the decoction to be poured off, as required.

It is necessary that a vent should be provided, through which the air may escape from the lower chamber as the water enters, and this may be accomplished in a variety of ways, as, for instance, the spout $b$ may be unstoppered and the confined air be permitted to escape, or a small stop-cock or cork may be inserted in the upper part of the lower chamber. But the method which I think is entirely satisfactory, and not liable to any objection, is to make a very small orifice at about the point $c$. When water is poured into the upper chamber it immediately passes down through the pipe C into the lower chamber, and the air escapes through the orifice $c$. When the water has entirely disappeared through the strainer D, then the required quantity of ground or broken coffee is placed upon the strainer, and heat is applied to the bottom of the cylinder. As soon as steam is generated there is a slight escape through the orifice $c$ into the mass of ground coffee, and this has an effect to soften the grains and render them more susceptible to the attack of the hot water, which is forced upward through the tube C into the ground coffee, and to fill the upper chamber, as soon as the steam-pressure becomes sufficient. When the hot water has been entirely driven from the lower to the higher chamber, the application of heat is discontinued, and condensation in the lower chamber begins to take place almost immediately, and the water is thereby redrawn into the lower chamber, passing through the mass of ground coffee a second time, and when it is all returned again to the lower chamber the process is completed, and the decoction is ready for use; or, if it is desired to make the decoction very strong, heat may be again applied, and the above-described process repeated.

It is quite evident that, so far as the operation above described is concerned, it is immaterial in what way or from what source the required heat is obtained. But, in order to insure a uniform result, without the constant care and supervision of an attendant, we have, from motives of convenience, attached our coffee-making cylinder by trunnions to a suitable stand, E, and have so arranged the whole that the extinguishment of the flame of the gas-burner F or the spirit-lamp G, or any other similar source of heat, may be secured at the proper moment by the automatic action of the apparatus, and, when the process has been completed and the decoction is ready for use, the final automatic act is to ring a signal upon a small bell, or some other suitable device. This portion of the invention we shall now proceed to explain.

The trunnions $d$ are fixed to the sides of the cylinder A, a little above the centre of gravity, so that when empty the cylinder will hang upright. The standards $e\ e$ are provided with sockets at their tops, fitted to receive the trunnions $d$, and a strap, $f$, or some other device, may be employed to prevent the cylinder from swinging past the perpendicular in a backward direction. When a stop-cock is employed to draw off the decoction, this stop may be made permanent, but, when the spout is employed for that purpose, then the stop $f$ must be made movable, to permit the cylinder to be tilted forward to pour out of the spout. The gas-tube $g$ and burner $h$ may be employed, if desired. In that case the stop-cock $i$ is provided with a lever, $k$, or some other suitable and efficient device, to close the cock at the proper moment.

Suppose, now, the water and coffee have been placed within the cylinder, and the latter placed properly upon its stand. Raise the lever $k$, until its free end rests against the side of the cylinder, and the cock $i$ will be opened, so that the gas can flow through into the burner. When the water in the lower chamber begins to boil, the steam-pressure in the lower chamber forces the water upward through the pipe C into the upper chamber, and, when somewhat more than half the contained quantity has been thus removed to the upper chamber, the poise of the cylinder is destroyed, and it tilts over backward, until arrested by the stop $f$ in a horizontal position. This motion of the cylinder pushes the lever $k$ over, past its point of equilibrium, and closes the cock through its own gravity, thus shutting off the gas and extinguishing the flame at the burner $h$. The generation of steam does not cease instantly upon removal of the source of heat, nor does the expansive power of it cease instantly upon cessation of generation, and in this case the consequence is an entire expulsion of the water from the lower chamber before condensation commences.

As soon as the expansion of the steam has ceased to exert its force, the water in the upper chamber commences to return to the lower chamber, and as the power exerted by the condensation of the steam, to return the water, will much more than overbalance the power necessary to expel it in the first place, it follows that it will all be returned, and, when more than half the quantity has returned to the lower chamber, the equilibrium will be again destroyed, and the cylinder will again assume an upright position, but it will not become entirely vertical until almost or quite the whole of the decoction has been returned to the lower chamber, and this last movement, in resuming a vertical position, trips the hammer $m$ and causes it to strike the bell $n$.

It is evident that the devices shown to shut off the gas and to strike the alarm may be greatly varied, both in form and position, but no mere variation in these particulars would necessarily involve a departure from the spirit of our invention.

If the apparatus is to be heated by means of a spirit-lamp, then the arrangement shown in fig. 3 may be employed, the lid or extinguisher $p$ being hinged, and, when the lamp is in operation, placed so as to rest against the cylinder. When the latter tilts backward the lid drops upon the flame and extinguishes it.

Having described our invention, what we claim as new, is—

1. A coffee-making apparatus, constructed with the shell A, partition B, strainer D, and tube C, or the equivalent of these parts, to operate in the manner set forth, and provided with the minute vent-holes $c$ through the partition B, substantially as and for the purpose set forth.

2. The coffee-making apparatus, constructed with a shell, A, partition B, strainer D, and tube C, or the equivalent of these parts, in combination with the stand E, or its equivalent, to support the said apparatus upon trunnions, as and to the effect set forth.

3. The coffee-making apparatus, as set forth in the next preceding claim, in combination with a device to extinguish the heating-flame, substantially as set forth.

4. The signal-bell $n$, in connection with and operated by the coffee-making apparatus set forth in the second preceding claim, substantially as described.

JULIUS PETSCH,
STEPHEN N. BUYNITZKY.

Witnesses:
R. D. O. SMITH,
R. S. TURNER.